United States Patent [19]

Hoenke

[11] Patent Number: 5,382,395
[45] Date of Patent: Jan. 17, 1995

[54] PROFILE EXTRUSION APPARATUS AND METHOD FOR EXTRUDING A PROFILE

[75] Inventor: Mark S. Hoenke, Stow, Ohio
[73] Assignee: Admiral Equipment Co., Midland, Mich.
[21] Appl. No.: 62,102
[22] Filed: May 14, 1993
[51] Int. Cl.⁶ .............................................. B29C 47/92
[52] U.S. Cl. ....................... 264/40.7; 156/108; 156/500; 264/177.19; 264/252; 264/279; 425/145; 425/382.4; 425/465
[58] Field of Search ................ 264/279, 252, 177.1, 264/177.17, 177.19, 339, 40.7; 425/382.4, 466, 145, 465, 192 R, 467, 381, 190 R; 156/107, 108, 500

[56] References Cited

U.S. PATENT DOCUMENTS

| | | |
|---|---|---|
| 192,128 | 6/1877 | Perry . |
| 413,834 | 10/1889 | Dargis et al. . |
| 1,422,356 | 7/1922 | Heller . |
| 2,402,281 | 10/1943 | Green . |
| 3,187,390 | 6/1965 | Frankel et al. ............... 425/466 |
| 3,193,878 | 7/1965 | Corbett .......................... 425/190 R |
| 3,477,870 | 11/1969 | Boretti et al. . |
| 3,525,382 | 10/1972 | Devol ............................. 164/154 |
| 3,748,079 | 7/1973 | Moreno et al. ............... 425/466 |
| 3,751,209 | 8/1973 | Schreiber ...................... 425/461 |
| 3,871,810 | 3/1975 | Geyer ............................ 425/374 |
| 4,124,346 | 11/1978 | Greenwood et al. ......... 425/188 |
| 4,145,173 | 3/1979 | Pelzer et al. ................. 425/224 |
| 4,150,931 | 4/1979 | Gabrys ........................ 425/186 |
| 4,205,104 | 5/1980 | Chenel ......................... 428/34 |
| 4,256,140 | 3/1981 | Swaroop et al. ............. 137/561 A |
| 4,333,896 | 6/1982 | Cunningham ............... 264/40.5 |
| 4,383,813 | 5/1983 | Podell et al. ................ 425/204 |
| 4,389,181 | 6/1983 | Frick ............................ 425/461 |
| 4,439,125 | 3/1984 | Dieckmann et al. ........ 425/140 |
| 4,532,148 | 7/1985 | Vecellio ........................ 427/31 |
| 4,551,372 | 11/1985 | Kunert .......................... 428/38 |
| 4,559,001 | 12/1985 | Wiedenhöfer et al. ....... 425/114 |
| 4,571,278 | 2/1986 | Kunert .......................... 156/108 |
| 4,581,276 | 4/1986 | Kunert et al. ................ 428/157 |
| 4,584,150 | 4/1986 | Baliocca ....................... 264/40.1 |
| 4,690,628 | 9/1987 | Dehennau et al. ........... 425/466 |
| 4,704,175 | 11/1987 | Kunert et al. ................ 156/108 |
| 4,753,824 | 6/1988 | Toda et al. ................... 427/286 |
| 4,839,131 | 6/1989 | Cloeren ....................... 425/192 R |
| 4,846,651 | 7/1989 | Matsuda et al. ............. 425/145 |
| 4,879,853 | 11/1989 | Braendle et al. ............. 52/208 |
| 4,892,473 | 1/1990 | Elia et al. ..................... 425/382.4 |
| 4,973,436 | 11/1990 | Lisec ............................ 264/40.1 |
| 4,984,977 | 1/1991 | Grimminger et al. ........ 425/145 |
| 4,997,509 | 3/1991 | Fujii ............................. 156/364 |
| 4,999,147 | 3/1991 | Kojima et al. ............... 264/139 |
| 5,046,666 | 9/1991 | Ono .............................. 239/73 |
| 5,057,265 | 10/1991 | Kunert et al. ................ 264/511 |
| 5,059,371 | 10/1991 | Saheki et al. ................ 425/382.4 |
| 5,061,429 | 10/1991 | Yoshihara et al. ........... 264/252 |
| 5,108,526 | 4/1992 | Cornils et al. ............... 156/108 |
| 5,137,675 | 8/1992 | Rabe ............................ 425/192 R |
| 5,167,756 | 12/1992 | Lenhardt ...................... 156/109 |
| 5,183,612 | 2/1993 | Suita et al. ................... 264/177.1 |
| 5,273,704 | 12/1993 | Scholl et al. ................. 264/252 |

FOREIGN PATENT DOCUMENTS 4-241925  8/1992  Japan ............................ 264/177.1

*Primary Examiner*—Jeffery R. Thurlow

[57] ABSTRACT

An apparatus (10) for extruding a profile material to form a profile (11) of substantially constant cross-section onto the peripheral edge (12) of an article (13). The apparatus (10) includes a movable die head (30) for circumferentially traversing the peripheral edge (12) of the article (13). The die head (30) has a profile orifice (31) positioned proximate to the peripheral edge (12) of the article (13), and a supply channel (50) in fluid communication with both the profile orifice (31) and a pressurized source of the profile material (24) for directing the profile material to the profile orifice (31). The apparatus also includes selectively pivotable vane means (60) positioned within the supply channel (50), wherein the vane means (60) is pivotable to variably direct the flow of the profile material to the profile orifice (31) as the die head (30) moves. A method for extruding a profile material to form a profile (11) of substantially constant cross-section onto the peripheral edge (12) of an article (13) includes the steps of directing a substantially constant amount of the profile material under pressure through a supply channel (50) and through a profile orifice (31) of a die head (30) as the die head (30) is directed to circumferentially traverse the periphery (12) of the article (13); and, variably directing the flow of the profile material to the profile orifice (31) with a selectively pivotable vane (60).

20 Claims, 7 Drawing Sheets

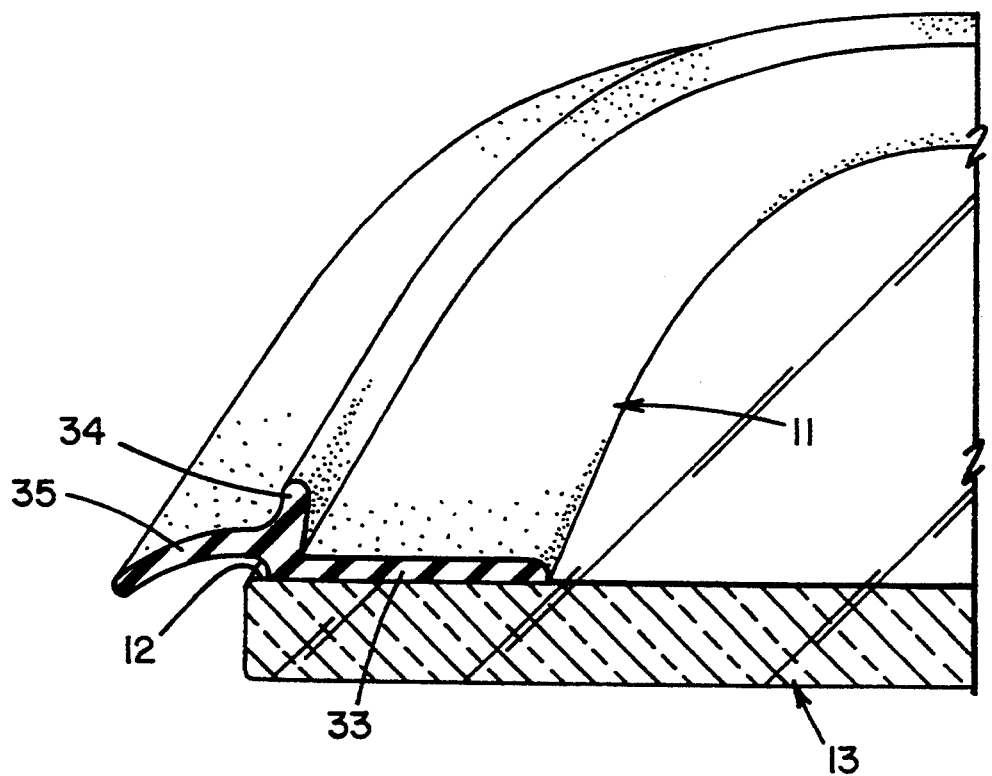
FIG. 8
FIG. 9
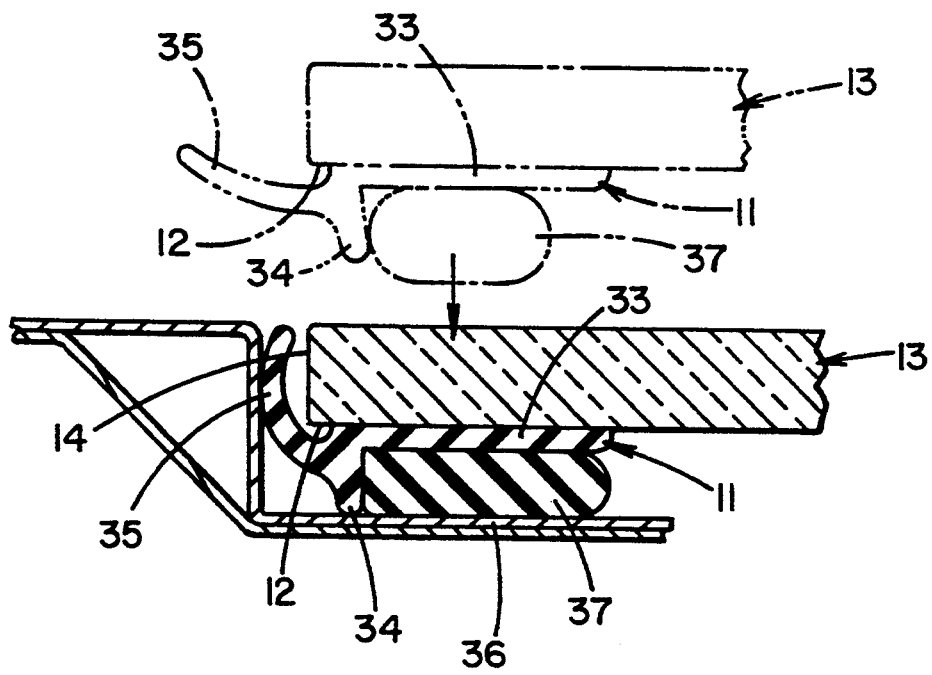

PROFILE EXTRUSION APPARATUS AND METHOD FOR EXTRUDING A PROFILE

TECHNICAL FIELD

The present invention generally relates to an apparatus for extruding a profile onto the peripheral edge of an article, and a method for extruding such a profile. More particularly, the present invention relates to an apparatus for extruding a profile onto an article having a complex corner geometry, such that the cross section of the profile remains substantially constant as between linear sections of the article and the corner geometry. Specifically, the present invention relates to an extrusion apparatus for forming such a profile, wherein the flow of material to a die orifice is varied by use of a vane member while the total amount of material directed to the orifice remains substantially constant.

BACKGROUND OF THE INVENTION

It is known in the art to provide an article such as an automotive windshield or the like, with a profile bead of a polymeric material around the peripheral edge of the article. A profile is often molded or otherwise fabricated, cured and adhesively bonded to the peripheral edge of the article. U.S. Pat. No. 5,108,526, for instance, discloses a method of forming a profile onto such an article by extruding a profile material directly to the peripheral edge thereof by use of a die head that can circumferentially traverse the peripheral edge of the article. The profile material is viscous and can be cured after being extruded. Profile materials are known which may air-cure such as by absorbing moisture or by the application of heat or the like.

With devices to extrude the profile material directly onto the peripheral edge of an article, it is known that it is difficult to extrude the profile uniformly around corners, bends, turns and the like. The die head is typically fitted with a die plate having an extrusion profile orifice therein. The orifice is normally positioned generally orthogonally to the peripheral edge of the article. Hence, when the die head is moved around a corner, the inside of the orifice moves at a slower rate than the outside of the orifice. By "inside" it is meant in a more proximate position to the article than the "outside" or more distal portion of the orifice.

Because the inside of the orifice moves at a slower rate than the outside of the orifice at the corners or bends of the article, a constant flow rate of profile material to the orifice will result in the deposition of more profile material at the inside of the orifice than at the outside. Accordingly, the profiles have non-uniform cross-sections between linear sections of the article and the corners thereof.

One proposed solution to this problem has been to adjust the total amount of material directed to the orifice. By pumping less material to the orifice, the inside section of the profile would not become too thick. However, the outside of the profile in the corner areas was then too thin and the problem of non-uniform cross-section remained.

Another proposed solution, which is disclosed for example in U.S. Pat. No. 5,108,526, was to provide two or more supply channels to the profile orifice, one generally positioned to supply the inside of the profile orifice and one to supply the outside of the orifice. One of the supply channels was then provided with a means for selectively restricting the flow of material therein, such that the portion of the profile adjacent thereto could be made thinner or thicker by adjusting the amount of material delivered to the respective portion of the orifice. The volume of the material delivered to the orifice was thus regulated.

It was found that the restrictively regulated flow channels still provided profiles of varying cross section. For example, it is stated in the '526 patent that thinner and thicker cross sections are selectively provided therein. Also, it has been found with devices such as that of the '526 patent, that when the separate channels were merged just prior to the orifice the benefits and effectiveness of the separate channels was lost.

Another drawback found to restrictively controlling flow in a flow channel, was that the total restriction of the flow within the nozzle was simultaneously varied as well. This was found to cause irregularities in the total flow at the nozzle due to the compressibility of the material and expansion capacity of the ducts connecting the material supply to the nozzle. The additional total increase in friction to the flow was found to additionally affect the delivery rate of material from the supply thereof.

A need exists therefore, for an apparatus for extruding a profile onto the peripheral edge of an article, wherein the cross section of the profile remains substantially constant throughout a linear section and a corner section of the article.

SUMMARY OF INVENTION

It is therefore, an object of the present invention to provide an apparatus for extruding a profile onto the peripheral edge of an article.

It is another object of the present invention to provide such a device wherein the profile has a substantially constant cross section.

It is yet another object to provide a method for extruding a profile onto the peripheral edge of an article.

At least one or more of the foregoing objects, together with the advantages thereof over the known art relating to extrusion apparatus and methods, which shall become apparent from the specification which follows, are accomplished by the invention as hereinafter described and claimed.

In general the present invention provides an apparatus for extruding a profile material to form a profile of substantially constant cross-section onto the peripheral edge of an article. The apparatus comprises a movable die head for circumferentially traversing the peripheral edge of the article. The die head has a profile orifice positioned proximate to the peripheral edge of the article, and a supply channel means in fluid communication with both the profile orifice and a pressurized source of the profile material for directing the profile material to the profile orifice. The apparatus also comprises selectively pivotable vane means positioned within the supply channel, wherein the vane means is pivotable to variably direct the flow of the profile material to the profile orifice as the die head moves.

The present invention also includes a method for extruding a profile material to form a profile of substantially constant cross-section onto the peripheral edge of an article. The method comprises the steps of directing a substantially constant amount of the profile material under pressure through a supply channel and through a profile orifice of a die head as the die head is directed to circumferentially traverse the periphery of the article;

and, variably directing the flow of the profile material to the profile orifice with a selectively pivotable vane means.

BRIEF DESCRIPTION OF THE DRAWINGS

FIG. 8 is a cross-sectional view of an exemplary profile after extrusion onto the peripheral edge of an article; and, FIG. 9 is a cross sectional side elevational view of the profile and article of FIG. 8 shown for exemplary purposes as installed into a structural framework.

PREFERRED EMBODIMENT FOR CARRYING OUT THE INVENTION

Figure 1:
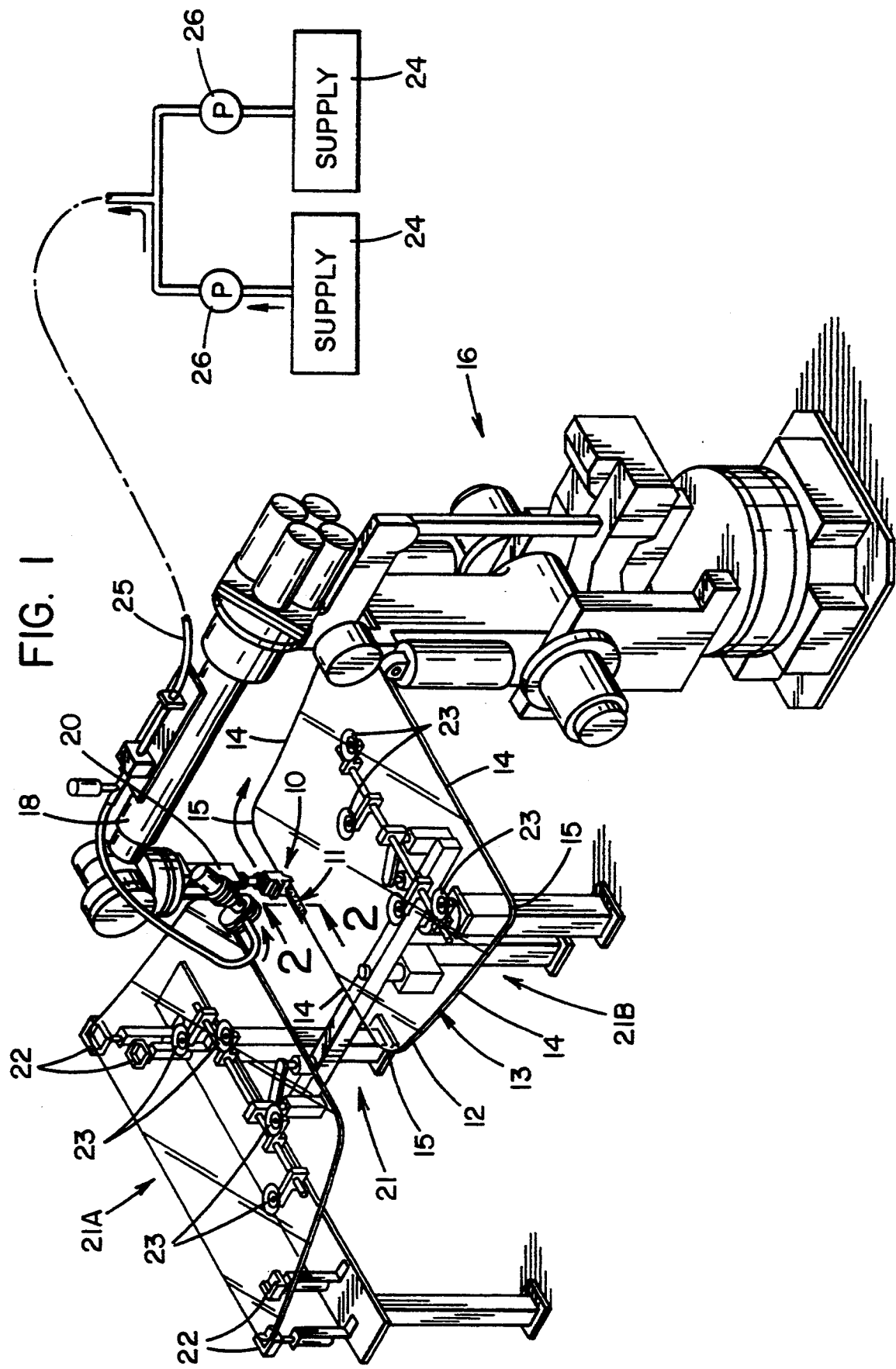
FIG. 1 is a perspective view of one embodiment of an extrusion apparatus embodying the concepts of the present invention, shown for exemplary purposes as used with an assembly line production system.

An extrusion apparatus embodying the concepts of the present invention, is generally indicated by the numeral 10 upon the attached drawings. The apparatus 10 according to the present invention is employed to extrude a profile 11 onto the peripheral edge 12 of an article such as automobile windshield glass 13, having linear portions 14 and corners 15. It will be appreciated that apparatus 10 may be employed to extrude a profile onto any type of article, and that glass 13 is exemplary of only one such use. For the sake of simplicity, these articles will be represented by glass 13 herein.

It is envisioned that apparatus 10 can be used with, for example, conventional robotic equipment, generally 16 having a robot arm 18, by being mounted on the end 20 thereof in any conventional manner. Glass 13 is preferably mounted onto a positioning device generally indicated by the number 21, which has positioning blocks 22 and suction devices 23 for securely positioning glass 13. More than one glass 13 may be mounted upon positioning device 21, which may have a first positioning section 21a and a second positioning section 21b, or of course, any number of such sections. In this manner, efficient assembly line production speeds may be achieved.

Profile material (not shown) which is to be extruded to form profile 11, is stored for example in supply units 24 fluidly connected to extrusion apparatus 10 by a hose line 25. Pumps 26 can be employed to pump the profile material to the extrusion apparatus 10. Robot arm 18 and end 20 are controlled in a conventional manner, to move extrusion apparatus 10 to circumferentially traverse peripheral edge 12 of glass 13, extruding profile 11 thereon.

Figure 2:
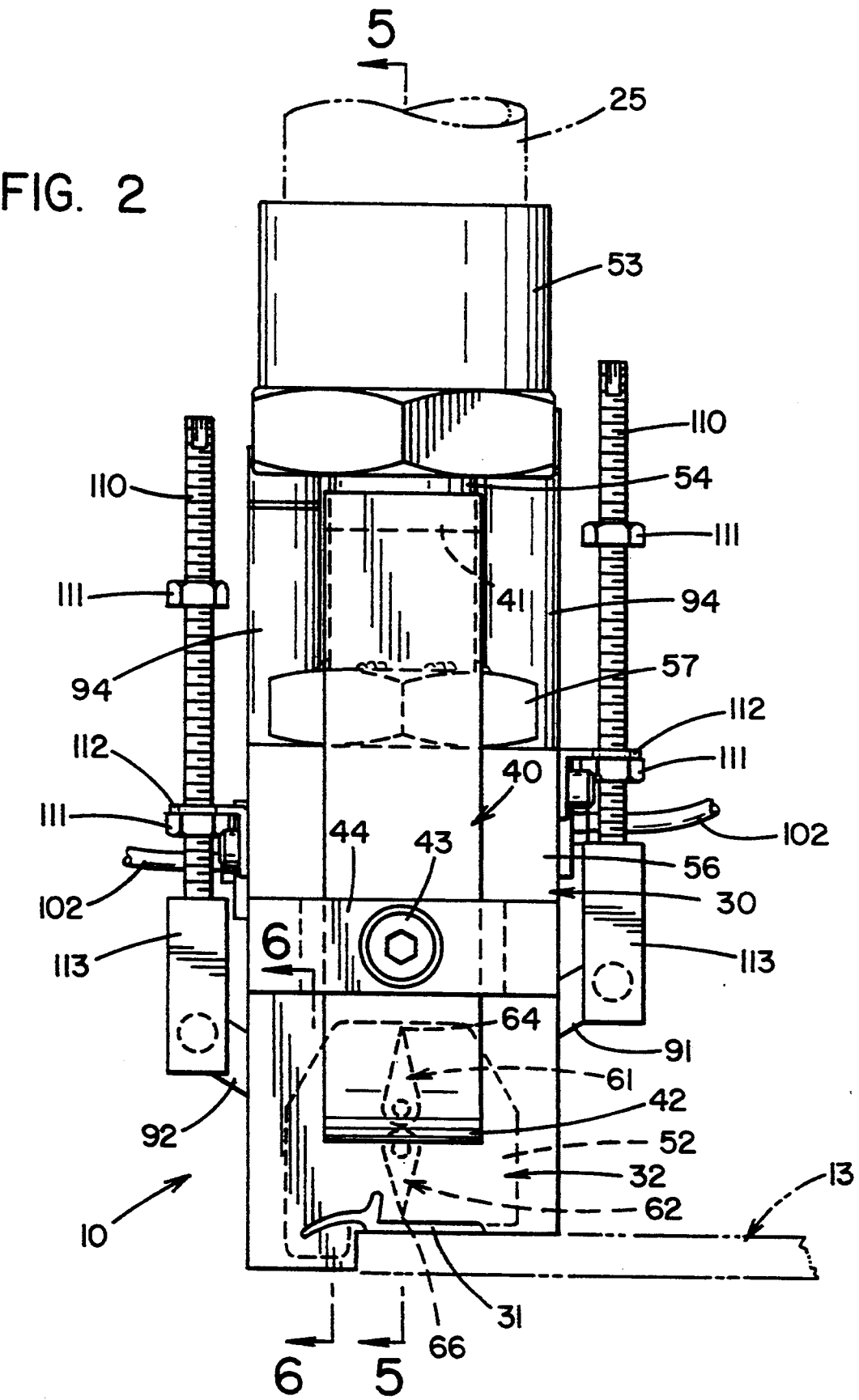
FIG. 2 is a front elevational view of the die head of the extrusion apparatus of FIG. 1, taken substantially along lines 2—2 thereof.
Figure 3:
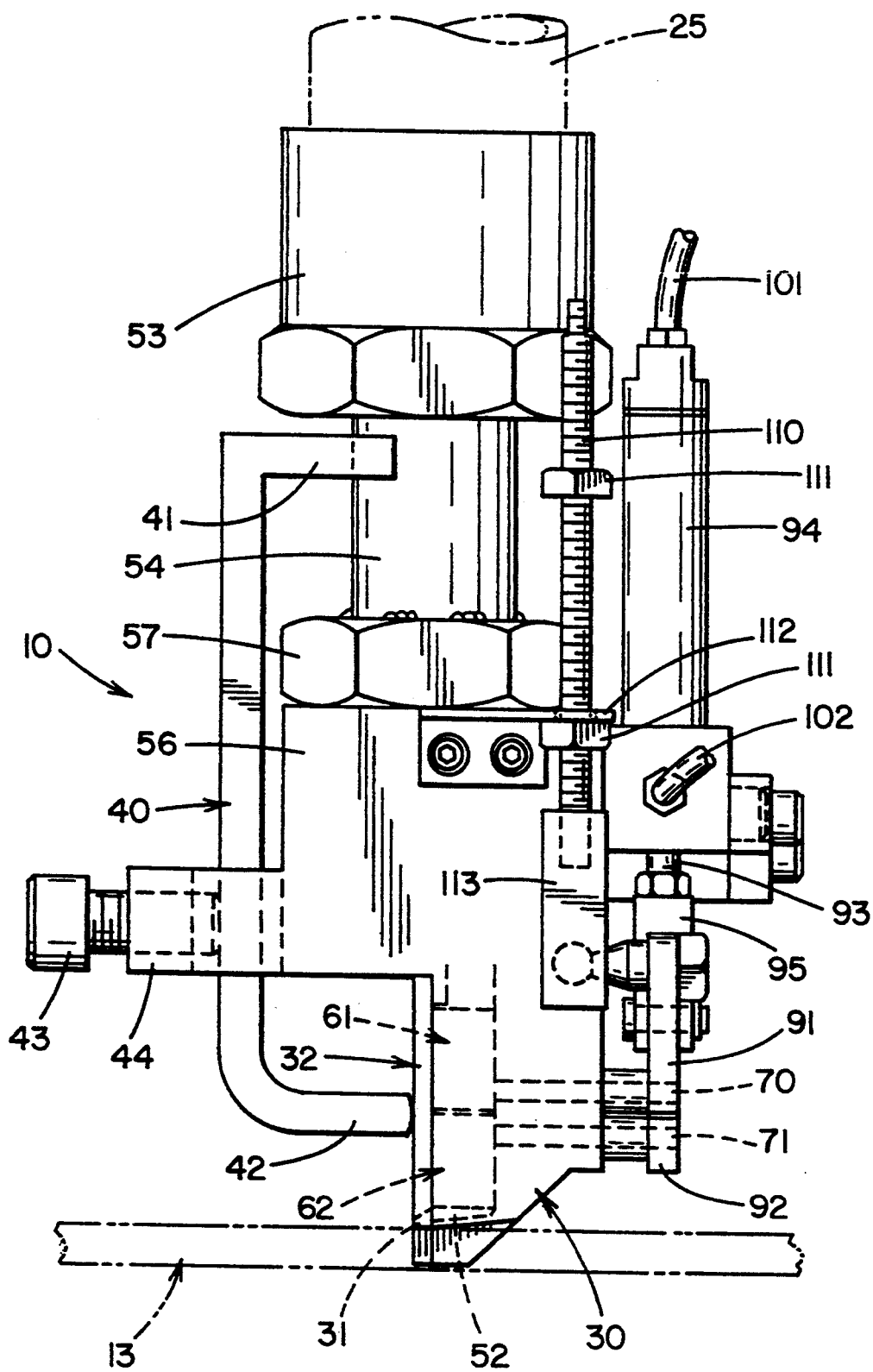
FIG. 3 is a side elevational view of the die head of FIG. 2.
Figure 4:
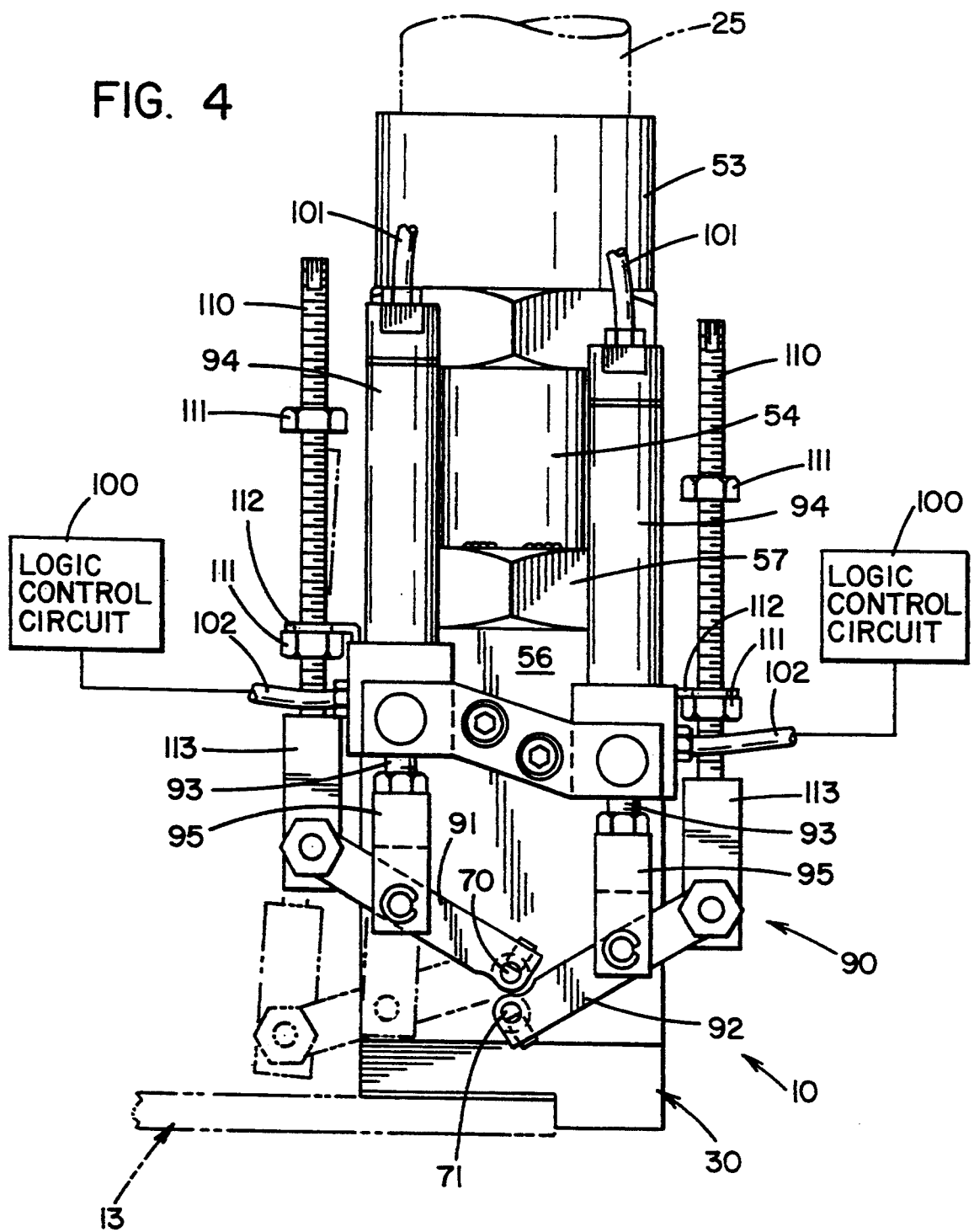
FIG. 4 is a rear view of the die head of FIG. 2.

In order to extrude profile 11 of substantially constant cross section onto peripheral edge 12 of glass 13, extrusion apparatus 10 includes a die head generally designated by the number 30. As shown in FIG. 2, profile forming material is directed by hose line 25 (shown in phantom) to die head 30. The profile forming material is then directed through an orifice 31 in a die plate 32 affixed to die head 30. As known in the art, orifice 31 is configured in the desired shape of the profile to be extruded, and is often elongate in configuration. Further details of an exemplary die head 30 will be provided hereinbelow.

One profile 11 is shown for exemplary purposes in FIG. 8. Profile 11 may include a base portion 33, a web portion 34 and an overhanging lip portion 35. Preferably, the profile material is a polymer which cures after exposure to air, such that the viscous material may be extruded directly onto glass 13.

Exemplary profile 11 of FIG. 8, is shown for environmental purposes in a structural framework 36 in FIG. 9. An adhesive bead 37 may be positioned between base 33 and web 34, and then to framework 36.

Returning to FIGS. 2-5, die plate 32 carrying profile orifice 31 may be affixed to die head 30 in any manner conventional in the art. For example, die plate 32 may be removably affixed to die head 30 by use of a U-shaped die plate retaining bar 40. One leg 41 of U-shaped retaining bar 40 engages die head 30, while another leg 42 engages die plate 32. A die plate retaining screw 43 is positioned through a retaining screw housing 44, such that by tightening screw 43, retaining bar 40 is securely held against die head 30 and die plate 32. To remove die plate 32, retaining screw 43 is loosened, allowing retaining bar 40 to be disengaged from both die head 30 and die plate 32. Thus, die plate 32 may be removed for cleaning or replacement.

As stated above, profile material is transported under pressure through hose line 25, and to die head 30. Die head 30 is provided with internal supply channel 50. For ease of construction as well as disassembly and cleaning, supply channel 50 may be divided into sections such as first supply channel 51 and second supply channel 52, wherein first and second supply channels 51 and 52 are in fluid communication with each other. First supply channel 51 fluidly communicates with and is connected to hose line 25 by any conventional means, such as by use of threaded neck and ring connector 53. First supply channel 51 is formed by supply channel connector 54 having neck 55 which couples with neck and ring connector 53. Further, supply channel connector 54 may be secured to a die block 56 of die head 30 in any manner, such as by threaded fitting 57. Seals such as O-ring 58 may be provided to fluidly seal supply channel 50.

Figure 5:
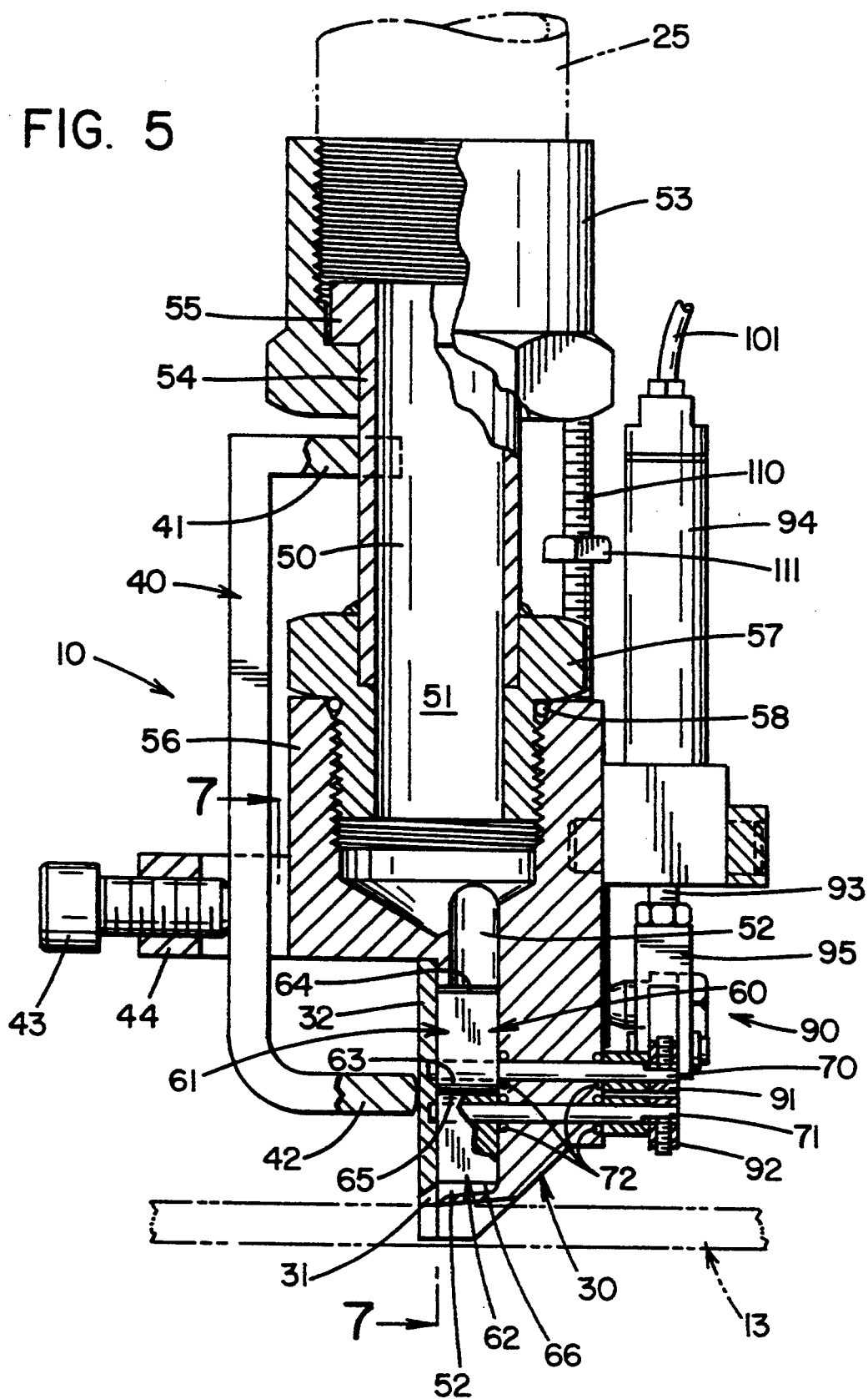
FIG. 5 is a cross sectional view taken substantially along line 5—5 of FIG. 2.
Figure 6:
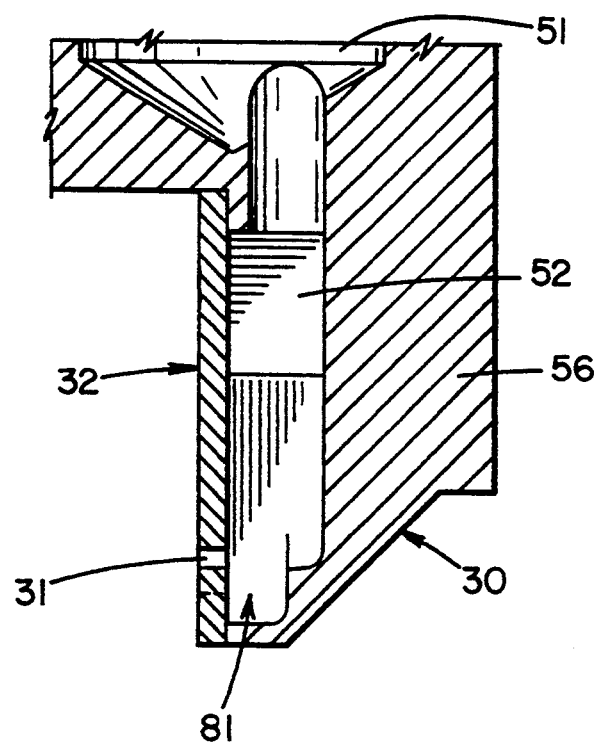
FIG. 6 is a close-up sectional view taken substantially along line 6—6 of FIG. 2.

Second supply channel 52 is positioned to be proximate to die plate 32 and orifice 31 (FIG. 5). Profile material under pressure, flows through hose line 25, through first supply channel 51, into and through second supply channel 52, and is then extruded through profile orifice 31.

According to the present invention, there is positioned within supply channel 52, a flow directing pivotable vane mechanism generally indicated by the number 60. Preferably, vane mechanism 60 includes a first vane member 61 and a second vane member 62. Furthermore, it is also preferred that vane member 61 be configured with a hub 63 and an apex 64 (FIG. 7).

Similarly, it is preferred that second vane member 62 be configured with a hub 65 and an apex 66. Hubs 63 and 65 are preferably placed in juxtaposition as depicted in the drawings, such that apex 66 is generally proximate to orifice 31 and apex 64 is generally distal thereto. Vane mechanism 60 is preferably positioned such that apex 66 is positioned at an approximate midpoint of elongate orifice 31 when apex 64 and apex 66 are aligned in the same plane.

Vane member 61 preferably is provided with preferably two face portions 67 extending between and connecting hub 63 and apex 64. Similarly, vane member 62 has preferably two face portions 68 extending between and connecting hub 65 and apex 66.

Figure 7:
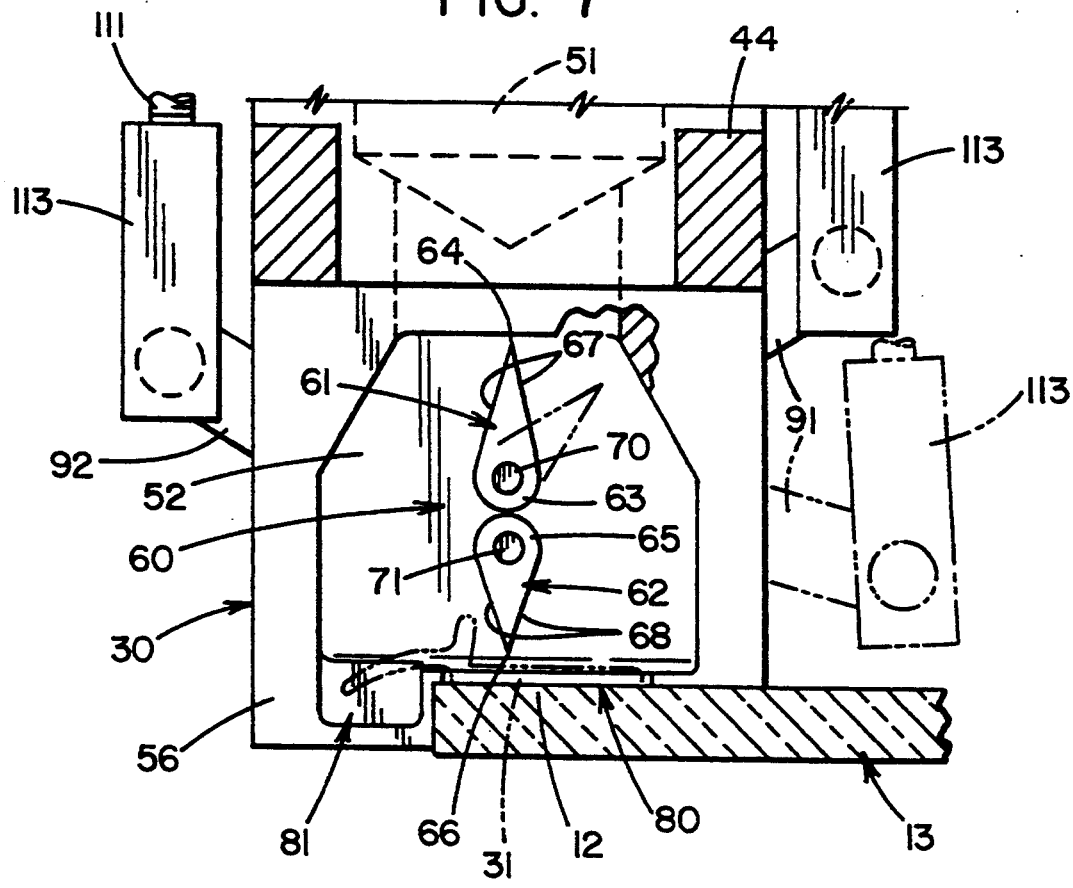
FIG. 7 is a close-up view of one portion of the die head taken substantially along line 7—7 of FIG. 5.

Hub 63 of first vane member 61 carries a selectively rotatable first pivot rod 70, such that as first pivot rod 70 is rotated, first vane member 61 pivots (as shown in phantom in FIG. 7). Similarly, hub 65 of second vane member 62 carries a second and separate pivot rod 71 and pivots with the selected rotation thereof. The degree of rotation of pivot rods 70 and 71, and hence the degree of pivoting of vane members 61 and 62 will vary depending upon the actual end use of the invention as well as the nature and viscosity of the profile material employed. O-ring seals 72 may be provided to fluidly seal first and second pivot rods 70 and 71.

As the profile material flows through first and second supply channels 51 and 52, first and second vane members 61 and 62 may be pivoted to direct the flow of material through supply channel 52 and to orifice 31. When apex 64 and apex 66 are in substantially the same plane as depicted in FIG. 7 in solid lines, the amount of material flowing to all portions of orifice 31 is generally equal. When a corner 15 in glass 13 is encountered, then vane members 61 and 62 may one or both be pivoted, such that the flow of profile material to one side of orifice 31 is varied with respect to the other side. It will be appreciated that the total amount of material extruded remains substantially constant. By properly selecting the degree of pivoting of vane members 61 or 62 or both, a profile of substantially constant cross section is extruded onto glass 13. Vane members 61 and 62 may be pivoted a predetermined amount as a corner 15 is encountered, or the pivoting may gradually increase and decrease during a cornering event.

For example, with reference to FIG. 7, when orifice 31 (shown in phantom) is elongate as depicted, it may be characterized as having a generally inside portion 80 proximate to glass 13, and an outside portion 81 more distal to glass 13. It is not critical that there be a clear division between inside portion 80 and outside portion 81. When a corner 15 is encountered, die head 30 remains substantially orthogonal to peripheral edge 12 of glass 13. Thus, outside portion 81 of die orifice 31 will travel faster than inside portion 80. Normally, as discussed above, this would result in more profile material being deposited in the general location of inside portion 80 and less material in the general location of outside portion 81.

According to the present invention, when the corner 15 is encountered, one or both vane members 61 and 62 are pivoted. For example, as shown in FIG. 7, first vane member 61 may be pivoted as shown in phantom in the drawing figure. The profile material flowing from first supply channel 51 enters second supply channel 52, where a greater portion of the material is directed toward the outside portion 81 of orifice 31 than is directed toward the inside portion 80. An amount of the profile material entering second supply channel 52 encounters first vane member 61 and is diverted thereby toward outside portion 81 of orifice 31. Profile material flows across face portion 67 of first vane member 61. By coordinating the degree of pivoting with the flow rate and the speed of the cornering event, the cross section of profile 11 formed is substantially constant. Furthermore, while it is not necessarily a limitation of the invention that vanes 61 and 62 be provided with apexes 64 and 66 respectively, a relatively sharp apex will assist to make the diversion of flow within second supply channel 52 more precise.

It is to be appreciated that first vane member 61 as positioned in second supply channel 52, does not cause restriction of the material flow therein because the total open area of second supply channel 52 is not diminished as vane 61 is rotated. Therefore, there is no need or occasion for detrimental back pressures to be placed upon pumps 26, as in the prior art. It is to be further appreciated that second vane member 62 which is also positioned within second supply channel 52 and proximate to profile orifice 31, can be employed to further direct the flow of the profile material as required to maintain a uniform cross section at corner 15 and that second vane member 62 additionally maintains separation of the flow of profile material into discrete portions divided by first vane member 61, toward and substantially to inside portion 80 and outside portion 81 of profile orifice 31.

Any means may be provided to effect pivoting of first and second vane members 61 and 62. One such means is generally depicted in the drawings (FIG. 4) as linkage mechanism 90. Linkage mechanism 90 includes links 91 and 92 affixed to pivot rods 70 and 71 respectively. Links 91 and 92 are each respectively rotatably connected to a separate piston rod 93 of a separate air cylinder 94 via clevis connectors 95. When an air cylinder 94 is activated, such as at the command of a logic control circuit 100, the piston rods 93 of the given air cylinder 94 is caused to move, such as shown in phantom in FIG. 4. Because of connection via clevis connector 95, the link 91 is caused to move. When link 91 is caused to move, pivot rod 70 is rotated, causing first vane member 61 to pivot in the manner described hereinabove. Second vane member 62 may be pivoted in a similar manner.

Logic control circuit 100 may be pre-programmed to cause an amount of compressed air (not shown) to enter air cylinders 94 either through inlet tubes 101 or 102. In a manner conventional in the art, depending upon which inlet tube 101 or 102 feeds compressed air into air cylinders 94, piston rods 93 are caused to move in a reciprocable manner. Hence, vane members 61 and 62 may be caused to pivot to direct profile material flow toward or away from either first or second portions 80 or 81 of profile orifice 31. The details and function of logic control circuits 100 are not a limitation of the present invention, and it will be appreciated that such control may be manually provided or provided by other means. Therefore, logic control circuit 100 is schematically represented in the drawings. Furthermore, any power drive unit other than air cylinders 94 may be employed to effect rotation of first and second pivot rods 70 and 71, and such rotation may also be manually effected. All such variation fall within the scope of the present invention.

The degree of rotation of pivot rods 70 and 71 may be predetermined and limited, such as by use of threaded limit rods 110 having threaded nuts 111 thereon. Limit rods 110 are positioned through stop plates 112. Each limit rod 110 is provided with a pair of threaded nuts 111, such that stop plate 112 is positioned between a pair of threaded nuts 111. Limit rods 110 are also rotatably connected to links 91 and 92 such as by second clevises 113. By preselecting the positioning of threaded nuts 111 upon limit rods 110, the maximum and minimum rotations of pivot rods 70 and 71 may be controlled. At such maximum or minimum rotation, one nut 111 engages stop plate 112, preventing further movement of the respective link and vane member operatively connected thereto.

Thus it is evident that the device and method of the present invention are highly effective in extruding a profile onto the peripheral edge of an article, wherein the profile has a substantially constant cross section even around corners of the article. The invention is particularly suited for automotive windows, but is not necessarily limited thereto. The device and method of the present invention can be used separately with other equipment, methods and the like.

Based upon the foregoing disclosure, it should now be apparent that the use of the extrusion apparatus and methods described herein will carry out the objects set forth hereinabove. It is, therefore, to be understood that any variations evident fall within the scope of the claimed invention. Thus, the scope of the invention shall include all modifications and variations that may fall within the scope of the attached claims.

What is claimed is:

1. An apparatus for extruding a profile material to form a profile of substantially constant cross-section onto the peripheral edge of an article, comprising:
   a movable die head for circumferentially traversing the peripheral edge of the article; said die head having a profile orifice positioned proximate to the peripheral edge of the article, and a supply channel means in fluid communication with both said profile orifice and a pressurized source of the profile material; and,
   selectively pivotable vane means positioned within said supply channel and proximate to said profile orifice, wherein said vane means is pivotable to variably direct the flow of a substantially constant amount of the profile material to said profile orifice.

2. An apparatus, as set forth in claim 1, wherein said vane means includes first and second independently pivotable vane members.

3. An apparatus, as set forth in claim 2, wherein said first and second vane members each comprise a hub and an apex, and a face portion extending between and connecting said hub and said apex.

4. An apparatus, as set forth in claim 3, wherein each said first and second vane members are separately pivotable via pivot rods carried by each said hub.

5. An apparatus, as set forth in claim 4, further comprising linkage means operatively connected to each of said pivot rods for selectively rotating said pivot rods.

6. An apparatus, as set forth in claim 5, wherein said linkage means is operatively connected to a powered drive means.

7. An apparatus, as set forth in claim 6, wherein said powered drive means is selectively activatable by a programmable logic control circuit.

8. An apparatus, as set forth in claim 3, wherein said hubs of said first and second vane members are juxtapositioned, and said vane means are positioned in said supply channel such that said apex of said first vane member is distal to said profile orifice and said apex of said second vane member is proximate to said profile orifice.

9. An apparatus, as set forth in claim 1, wherein said die head includes a die plate carrying said profile orifice.

10. An apparatus, as set forth in claim 9, wherein said die plate is removably affixed to said die head with a die plate retaining bar, said die plate retaining bar being removably affixed to said die head.

11. An apparatus, as set forth in claim 1, wherein said profile orifice is generally elongate having at least first and second portions.

12. An apparatus, as set forth in claim 11, wherein said vane means selectively directs a variable amount of the profile material to said first and second portions of said profile orifice respectively.

13. A method for extruding a profile material to form a profile of substantially constant cross-section onto the peripheral edge of an article, comprising the steps of:
   directing a flow of the profile material under pressure through a supply channel and through a profile orifice of a die head as said die head is directed to circumferentially traverse the periphery of the article; and,
   variably directing the flow of the profile material to said profile orifice with a selectively pivotable vane means positioned within said supply channel and proximate to said profile orifice, such that a substantially constant amount of the profile material is directed to flow through said profile orifice as said die head is directed to circumferentially traverse the periphery of the article.

14. A method, as set forth in claim 13, wherein said step of variably directing the flow of the profile material with said selectively pivotable vane means includes the step of pivoting at least a first pivotable vane member.

15. A method, as set forth in claim 14, wherein said step of pivoting said first pivotable vane member includes the step of selectively activating a power drive means operatively connected to said vane means.

16. A method, as set forth in claim 15, wherein said step of selectively activating a power drive means includes the step of programming a logic control circuit operatively connected to said power drive means.

17. A method, as set forth in claim 13, wherein the total area of said supply channel remains substantially constant during said step of variably directing the flow of the profile material to said profile orifice.

18. A method, as set forth in claim 17, wherein the flow of the profile material within said supply channel is separated into substantially discrete portions by said step of variably directing the flow of the profile material to said profile orifice.

19. A method, as set forth in claim 18, comprising the further step of maintaining said discrete portions in the flow of profile material with said vane means, substantially to said profile orifice.

20. An apparatus for extruding a profile material to form a profile of substantially constant cross-section onto the peripheral edge of an article, comprising:
   a movable die head for circumferentially traversing the peripheral edge of the article; said die head having a profile orifice positioned proximate to the peripheral edge of the article, and a supply channel means in fluid communication with both said profile orifice and a pressurized source of the profile material; and,
   selectively pivotable vane means positioned within said supply channel, wherein said vane means is pivotable to variably direct the flow of the profile material to said profile orifice; said vane means including first and second independently pivotable vane members each said first and second vane members comprising a hub, an apex and a face portion extending between and connecting said hub and said apex; wherein said hubs of said first and second vane members are juxtapositioned, and said vane means are positioned in said supply channel such that said apex of said first vane member is distal to said profile orifice and said apex of said second vane member is proximate to said profile orifice; and wherein said profile orifice is generally elongate having at least first and second portions, such that said vane means selectively directs a variable amount of the profile material to said first and second portions of said profile orifice respectively.

* * * * *